United States Patent Office

2,842,457
Patented July 8, 1958

2,842,457

DECORATING COMPOSITIONS

Jack E. Morgan, Westfield, and Charles W. Wagner, Metuchen, N. J., assignors to E. I. du Pont de Nemours and Company, Wilmington, Del., a corporation of Delaware No Drawing. Application May 17, 1957
Serial No. 659,770

8 Claims. (Cl. 117—46)

This invention relates to precious metal decorating compositions, and more particularly it relates to new and improved liquid precious metal decorating compositions suitable for application on glass, china, porcelain, and other ceramic bodies and which, upon firing at a temperature between 550° C. and 750° C., will produce adherent bright gold and other precious metal designs.

So-called "liquid bright gold" compositions for the decoration of ceramics have been known for many years. In accordance with Boudnikoff, Comp. rend. 196, 1898–9 (1933), a terpene sulfide is first prepared by mixing a terpene such as Venice turpentine with sulfur flowers or nitrogen sulfide, $N_4S_4$, and boiling the same for an hour and a half at 160° C. to 170° C. To the resulting terpene sulfide is added a solution of potassium chloroaurate, $KAuCl_4$, in methyl alcohol. This mixture is stirred and after one hour the alcohol is evaporated. The residue is dissolved in chloroform and is neutralized with sodium carbonate and filtered. The filtered liquid is poured into methyl alcohol to precipitate a gold resinate. The resinate is dissolved in certain essential oils, e. g., rosemary, lavender, fennel, or aniseseed oils. In order that the gold will adhere well and fire to a bright finish, it is also necessary to add certain so-called gold fluxes to the gold resinate solution. Fluxes of this kind include rhodium resinate, bismuth flux, chromium flux, and Assyrian asphalt dissolved in nitrobenzol. Finally, a thickener is customarily added, for example, pine rosin or a mixture of pine rosin and sulfur in an essential oil. Such liquid bright gold is referred to in the art as a solution of a terpene gold resinate in a resin-oil binder. Other terpenes such as beta-terpineol may be used to form the gold resinate, in which case the gold compound is known as terpineol gold resinate.

Another type of gold resinate for the production of a liquid bright gold is described in U. S. Patent No. 2,490,399, issued to K. H. Ballard. The gold resinate of this patent is referred to as the resinous gold reaction product of auric chloride and a cyclic terpene mercaptan, or simply as a terpene mercaptan gold resinate.

Ceramic bodies such as glass or chinaware are commonly decorated with glass colors and gold in various designs or lines. Frequently both types of decoration are used on the same piece. The glass colors are frequently mounted on decalcomanias from which they are transferred to the surface of the ceramic body to be decorated. For example, a dinner plate may have a colored flower design in the center and smaller color designs on the flange or verge of the plate, all most likely applied as decalcomanias, and also one or more gold bands or lines on the verge or edge of the plate. The decals are customarily applied by coating a somewhat larger area of the plate with a boiled linseed oil varnish, drying or baking the varnish, adhering the face of the decal to the varnish and removing the paper decal backing with water or detergent solution. The gold is applied by brush (hand lining), roll (machine lining) or rubber stamp (stamping). The gold and glass color designs are then fired simultaneously. It has been essential that the glass color decal be applied first since the washing operation will damage a gold decoration previously applied. Great care was consequently required in applying and washing the decal because any decal varnish accidentally applied where gold was to be applied later would produce a disrupted gold film. Dry soluble salts left from washing of the decals also damaged the gold decoration. It has long been desired to apply the gold before application of the decals but no known means was at hand to protect such gold from water wash or damage due to handling.

As will be apparent from the prior art, the production of liquid bright gold compositions which may be painted or printed on a ceramic body and fired to produce a bright, strongly adherent gold design is a precise and critical procedure.

All liquid bright gold compositions heretofore produced for use in the decoration of ceramics have, upon application to the ceramic body and prior to firing, been easily damaged by handling or washing operations. Particular difficulty has been experienced in rubbing off of such gold applications on other parts of chinaware or the like, necessitating subsequent expensive erasing steps.

It is an object of this invention to produce liquid bright gold compositions that upon application and prior to firing will exhibit great hardness and will not rub off or be easily damaged by handling or washing operations.

It is another object of this invention to produce a new and improved liquid bright gold which may be easily applied to a ceramic and set up to a hard surface, and may be subsequently fired to a strongly adherent, brilliant gold finish.

Other objects of this invention will appear hereinafter.

These objects may be accomplished by combining a liquid bright gold composition with a solution of a thermosetting epoxy resin.

The liquid bright gold-epoxy resin combination may be applied as a liquid to a ceramic body, for example, a chinaware plate, then heating the body to a temperature of between 75° C. and 200° C. for a period of five minutes to two hours to cause said gold-epoxy resin to set, and subsequently the chinaware containing this set gold-epoxy resin is fired at a temperature of between 600° C. and 800° C. to obtain a strongly bonded brilliant gold finish without necessity of burnishing or otherwise polishing.

The liquid bright gold-thermosetting epoxy resin compositions of this invention may be prepared by combining a gold resinate with a bismuth flux and a rhodium flux, a thermosetting epoxide resin, and a solvent for said substances.

In some instances, it may also be desirable to add chromium or vanadium fluxes and viscosifying agents.

The gold resinate may be terpineol gold resinate or any of the cyclic terpene mercaptan gold resinates above referred to. The bismuth and rhodium fluxes are organic bismuth and rhodium containing compounds which are soluble in a solvent which will also dissolve the gold resinate and the epoxide resin. The bismuth flux is commonly prepared by reacting about 2% to 20% of an inorganic bismuth compound such as bismuth subnitrate with rosin and dissolving the product in a solvent, for example, camphor, orthonitrotoluene, cineol, monochlorobenzene, spike lavender oil, or the like, or mixtures thereof. The rhodium flux is commonly prepared by reacting a rhodium compound such as rhodium chloride with a sulfurized terpene, for example, turpentine that has been heated with elemental sulfur and then dissolved in an organic solvent such as referred to above with reference to the bismuth flux.

Where chromium or vanadium fluxes are used, they may, for example, be prepared by reacting $CrO_3$ or $V_2O_5$ with rosin and likewise dissolving the product with an organic solvent.

The epoxy resins are relatively new thermosetting resins based upon the reaction between epichlorhydrin and bisphenol-A and containing as curing agents various amines, acid anhydrides, dibasic acids and similar materials that do not catalyze a polymerization at room temperature but cause the resin to set up quickly at elevated temperatures, as disclosed in the articles beginning at page 101 of 1955 "Modern Plastics Encyclopedia Issue," vol. 33, No. 1A, and page 105 of the 1956 issue of the same publication, vol. 34, No. 1A. Any of the thermosetting epoxy resins may be used in preparing useful thermosetting liquid bright golds in accordance with this invention. Very good results may be obtained by the use of polyethers A to F, inclusive, and the polyepoxides disclosed in column 3 in U. S. patent to Shokal No. 2,732,367. Other types of thermosetting resins have not been suitable for use as binders for liquid bright gold compositions. Previous attempts to use other resinous binders have resulted in gold having a scummed appearance or a completely disrupted film.

The following examples are given to set forth in detail certain specific embodiments of the invention, it being understood that the invention is not to be limited to the specific details set forth therein.

In the formulations of the examples, reference will be made to the following specific substances which may be prepared by the methods set forth:

(A) *Terpineol gold resinate.*—Prepared by reacting beta-terpineol with sulfur flowers by boiling at a temperature of 165° C. for a period of one and one-half hours. To the resulting terpineol sulfide is added, at room temperature, sufficient $KAuCl_4$ in methyl alcohol to form a resinate containing 20% to 25% gold. The methyl alcohol is then boiled off and the residue dissolved in chloroform and then neutralized with sodium carbonate and filtered. The filtered liquid is poured into methyl alcohol to precipitate terpineol gold resinate.

(B) *Bismuth flux.*—Prepared by reacting bismuth subnitrate and rosin in such proportions that the reaction product will contain 3% $Bi_2O_3$ on ignition.

(C) *Rhodium flux.*—Prepared by reacting rhodium chloride ($RHCl_3$) with a sulfurized terpene resin, e. g., turpentine reacted with an equal weight of elemental sulfur, in such proportions that the resulting rhodium reaction product contains 3% rhodium oxide upon ignition.

(D) *Chromium flux.*—Prepared by reacting chromium oxide with rosin in such proportions that the resulting chromium reaction product will contain 3% $Cr_2O_3$ on ignition.

(E) *Vanadium flux.*—Prepared by reacting vanadium oxide with rosin in such proportions that the resulting vanadium reaction product will contain 4.5% $Va_2O_5$ on ignition.

(F) *Epoxy resin.*—A resin-forming mixture of epoxy compounds was prepared containing 75% of the glycidyl ether of bisphenol and 25% of the polyglycidyl ether of glycerol together with 8 parts by weight of diethylene triamine per 100 parts of the mixture of epoxy compounds as curing agent therefor.

(G) *Solvent.*—A solvent composition containing:

| | Percent |
|---|---|
| Camphor | 15 |
| Orthonitrotoluene | 30 |
| Cineol | 25 |
| Monochlorobenzene | 20 |
| Spike lavender oil | 10 |

*Example I*

A terpineol gold resinate-epoxy resin-thermosetting liquid bright gold is prepared as follows:

47% terpineol gold resinate A.
6.8% flux containing 4% of bismuth flux B, 2% of rhodium flux C, and 0.8% of chromium flux D, the remainder solvent G.
0.1% brown dyestuff.
11.5% epoxy resin solution consisting of 45% of epoxy resin F, and 55% of butyl Cellosolve acetate.
34.6% solvent G.

The above ingredients are mixed to produce a brown-colored thermosetting liquid bright gold containing approximately 11% gold. This gold solution may be applied to a ceramic body by painting with a brush and the ceramic body heated for five minutes to two hours to a temperature of between 75° C. and 200° C. and thereby set to a relatively hard solid which will not be removed or damaged by any ordinary handling such as chinaware or the like is conventionally subjected to.

Chinaware may be first decorated and thermoset with such gold decoration and glass color decals applied subsequently thereto and washed with aqueous solutions, for removal of paper backing, without damage to the gold decoration. The chinaware may then be subjected to firing at a temperature of 600° C. to 800° C. to form on the chinaware a strongly adherent, highly brilliant gold decoration. The glass colors will, of course, be fired on the chinaware at the same time as the gold decoration.

*Example II*

46.8% terpineol gold resinate A.
6.8% flux containing 4% of bismuth flux B, 2% of rhodium flux C, and 0.8% of chromium flux D, the remainder being solvent G.
0.1% brown dyestuff.
16.16% epoxy resin solution consisting of 45% of epoxy resin F and 55% of butyl Cellosolve acetate.
30.14% solvent G.

The above ingredients are mixed as in Example I and produce a liquid bright gold composition that is slightly more viscous and may be used as a stamping gold.

*Example III*

Example I is repeated using in place of terpineol gold resinate A the alpha-pinene mercaptan gold resinate prepared in accordance with Example I of U. S. Patent No. 2,490,399 issued to K. H. Ballard.

The same highly desirable thermosetting qualities of Example I (above) are obtained and after firing the gold decoration is bright and adheres well.

*Example IV*

A pinene mercaptan gold resinate-epoxy resin-thermosetting liquid bright gold is prepared as follows:

25% alpha pinene mercaptan gold resinate prepared in accordance with Example I of U. S. Patent No, 2,490,399, containing about 43.74% gold.
6.8% flux containing 4% bismuth flux B, 2% rhodium flux C, 0.8% chromium flux D, and 93.2% solvent G.
0.1% brown dyestuff.
34.05% epoxy resin solution consisting of 45% epoxy resin F and 55% of butyl Cellosolve acetate.
34.05% solvent G.

The above ingredients are mixed to produce a brown thermosetting liquid bright gold containing about 11% gold.

This liquid bright gold has the desirable qualities of thermosetting, bright finish, and adherence of the gold of Example I above, and may be applied by hand brushing on dinner ware or the like to produce a highly desirable finish.

*Example V*

The thermosetting liquid bright gold compositions of Examples I, II, III and IV above may be made as liquid bright platinum or liquid bright palladium compositions by formulating the compositions with 1.5% ±0.5% less gold and the addition of 1.5% ±0.5% platinum or palladium. The platinum and palladium may be added as platinum or palladium resinates prepared with cyclic terpene mercaptans or with beta-terpineol sulfide, as above described.

In the above examples the brown dystuff is added merely as a coloring agent and may be omitted or replaced by other dyestuff. The colors are used in the gold compositions to visualize the lines of application of the compositions prior to firing.

*Example VI*

A terpineol gold resinate-epoxy resin-thermosetting liquid bright gold suitable for decorating and firing on glassware is prepared as follows:

39% terpineol gold resinate A.
6.8% flux containing 4% of bismuth flux B, 1% of rhodium flux C, 2.5% of vanadium flux E, and 92.5% solvent G.
0.1% brown (or other color) dyestuff.
19.6% epoxy resin solution consisting of 45% of epoxy resin F and 55% of butyl Cellosolve acetate.
34.5% solvent G.

The above ingredients are mixed, applied to glassware, thermoset and fired as in Example I with the same excellent results described in Example I.

In the preparation of liquid bright gold, platinum or palladium compositions of this invention, the flux amount may be varied according to the gold content of the compositions and the proposed firing conditions to produce a bright, adherent, scum-free decoration, after firing. The amount of resin and solvent may also be varied to change the viscosity depending upon application method, brush, roll, or stamp. The epoxy resin used will depend upon the solvent used and the curing agent and flux employed. The solvent, in turn, may be varied, it being necessary only that the several ingredients are mutually soluble in the solvent employed.

The thermosetting liquid bright gold of this invention can be used in the decoration of chinaware, glassware, porcelain, and the like, to produce bright, adherent, fired-on precious metal decorations, and has the advantage that gold decorations can be applied and thermoset so that no damage to the decoration will be encountered by handling prior to firing.

Throughout the specification and claims, any reference to parts, proportions and percentages, refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

We claim:

1. A thermosetting liquid precious metal composition comprising a precious metal resinate, a flux for said precious metal, a thermosetting epoxy resin, and a solvent for said resinate, flux and resin.

2. A thermosetting liquid gold composition comprising a gold resinate, a flux for said gold, a thermosetting epoxy resin, and a solvent for said resinate flux and resin.

3. A thermosetting liquid precious metal decorative composition comprising a precious metal resinate taken from the group consisting of terpineol sulfide resinates and cyclic terpene mercaptan resinates, a flux for said precious metal, a thermosetting epoxy resin, and a solvent for said resinate, flux and resin.

4. A thermosetting liquid gold decorative composition comprising a gold resinate taken from the group consisting of gold terpineol sulfide resinates and gold cyclic terpene mercaptan resinates, a flux for said gold, a thermosetting epoxy resin, and a solvent for said resinate, flux and resin.

5. A thermosetting liquid gold decorative composition comprising a gold resinate taken from the group consisting of gold terpineol sulfide resinates and gold cyclic terpene mercaptan resinates, a bismuth flux for said gold, a rhodium flux for said gold, a thermosetting epoxy resin, and a solvent for said resinate, flux and resin.

6. A thermosetting liquid gold decorative composition comprising gold terpineol sulfide resinate, a bismuth flux for said gold, a rhodium flux for said gold, a thermosetting epoxy resin, and a solvent for said resinate, flux and resin.

7. A precious metal decorating process which comprises applying to a ceramic body a thermosetting liquid precious metal decorative composition comprising a precious metal resinate taken from the group consisting of terpineol sulfide resinates and cyclic terpene mercaptan resinates, a flux for said precious metal, a thermosetting epoxy resin, all dissolved in a solvent for said substances, heating said ceramic body to set said decoration, and firing said decoration to a bright, adherent precious metal form.

8. A gold decorating process which comprises applying to a ceramic body a thermosetting liquid gold decorative composition comprising gold resinate taken from the group consisting of terpineol sulfide resinates and cyclic terpene mercaptan resinates, a flux for said gold, a thermosetting epoxy resin, all dissolved in a solvent for said substances, heating said ceramic body to set said decoration, and firing said decoration to a bright, adherent gold form.

References Cited in the file of this patent

UNITED STATES PATENTS

| | | |
|---|---|---|
| 2,490,399 | Ballard | Dec. 6, 1949 |
| 2,700,008 | Compton et al. | Jan. 18, 1955 |

FOREIGN PATENTS

| | | |
|---|---|---|
| 648,209 | Great Britain | Jan. 3, 1951 |